United States Patent

[11] 3,567,031

| [72] | Inventor | Herbert H. Loeffler |
| --- | --- | --- |
| | | Arlington, Mass. |
| [21] | Appl. No. | 828,936 |
| [22] | Filed | May 29, 1969 |
| [45] | Patented | Mar. 2, 1971 |
| [73] | Assignee | Amicon Corporation |
| | | Lexington, Mass. |

[54] AUTOAGITATING ULTRAFILTRATION APPARATUS
8 Claims, 2 Drawing Figs.

[52] U.S. Cl. .................................................. 210/321,
210/416, 210/433, 210/445, 210/456
[51] Int. Cl. ........................................................ B01d 31/00
[50] Field of Search .......................................... 210/321,
433, 445, 456, 23, 416

[56] References Cited
UNITED STATES PATENTS

| 3,085,687 | 4/1963 | Erbach .......................... | 210/321X |
| 3,133,132 | 5/1964 | Loeb et al. .................... | 264/49 |
| 3,285,421 | 11/1966 | McKelvey, Jr. et al. ...... | 210/433X |
| 3,305,097 | 2/1967 | Hatelson ....................... | 210/321 |
| 3,352,422 | 11/1967 | Heden ........................... | 210/321 |

Primary Examiner—Frank A. Spear, Jr.
Attorney—R. W. Furlong

ABSTRACT: Ultrafiltration apparatus of the thin-channel type comprising a flow-directing means and a reservoir for fluid. The flow-directing means is advantageously in a spiral form so that it may impart a mixing action to fluid passed therefrom into the reservoir.

PATENTED MAR 2 1971   3,567,031

INVENTORS
HERBERT H. LOEFFLER
BY Andrew F. Kehoe
ATTORNEY

AUTOAGITATING ULTRAFILTRATION APPARATUS

BACKGROUND OF THE INVENTION

Ultrafiltration is a process whereby very small components of solutions or fluid suspensions are separated therefrom by passage through an ultrafiltration media. Such media are usually selected from ultrafiltration membranes known in the art. For the purposes of this patent "ultrafiltration membranes" is meant to include anisotropic membranes, e.g. of the surface filter type sold under the trademark by Amicon Corporation, the isotropic or homogeneous membranes which are of the depth filter type, and those membranes across which molecules must travel by chemically activated diffusion processes such as reverse osmosis type of processes. The surface filters are preferred for use in macromolecular filtration and concentration. The reverse osmosis type of membranes are mostly used with very small molecular species such as inorganic salt-derived impurities in salt and brackish water.

It has been discovered that thin-channel-type ultrafiltration apparatus is particularly advantageous in desalination of salt water. More recently it has been discovered that, under certain circumstances, thin-channel processing techniques can be applied, under certain conditions, to ultrafiltration of solutions comprising macromolecular solutes. Various apparatus has been described in U.S. Pat. application Ser. Nos. 797,071 and 792,636 filed Feb. 6, 1969 and Jan. 21, 1969 respectively by Herbert H. Loeffler, which apparatus is especially useful in this thin-channel processing.

Nevertheless, there has been a need to provide more compact and versatile thin-channel apparatus which, for example, can be readily inserted in conventional well-stirred batch cell equipment for laboratory testing and evaluation techniques. Provision of such versatile apparatus presents a number of problems including sealing problems, and problems relating to achieving the proper agitation of the fluid to be subject to ultrafiltration when the fluid is so far removed from any magnetic stirring means to utilize, conveniently, that common method of stirring.

SUMMARY OF THE INVENTION

Therefore, it is an object of the instant invention to provide a novel and versatile thin-channel ultrafiltration apparatus.

Another object of the invention is to provide a novel apparatus comprising a reservoir for the liquid to be ultrafiltered, a means for causing that liquid to flow in an advantageous path across an ultrafiltration medium and a novel means to agitate the reservoir of liquid to be ultrafiltered.

Another object of the invention is to provide a novel process for operating a thin-channel ultrafiltration apparatus wherein the flow path used to direct liquid across the membrane surface is also used to impart a mixing action to the liquid, which mixing action is used to keep a reservoir of liquid well mixed.

Other objects of the invention will be obvious to those skilled in the art on reading the instant specification.

The above objects have been substantially achieved by construction of an ultrafiltration apparatus which includes a reservoir assembly having on one surface thereof, and integral therewith, a flow directing means which is in a plane parallel to a membrane and which is positioned against the membrane to provide a flow path parallel to the membrane surface. In the preferred embodiments of the invention, the flow path is in the form of a spiral which imparts spin to liquid emitting therefrom. When the flow is terminated by emptying into the aforesaid reservoir there is a desirable mixing action imparted to the contents of the reservoir.

Although those skilled in the art will realize that it is not necessary to each embodiment of the invention, it is convenient if the reservoir assembly comprises bearing surfaces which allow the assembly to be substituted for a conventional batch-cell cylinder in preexisting commercially available ultrafiltration apparatus.

By "thin-channel" is meant a flow path arranged parallel to the surface of a membrane and having a maximum depth of about 0.030 inch. It is advantageously sufficiently wide to avoid turbulent flow, i.e. to provide for flow wherein the Reynolds Number can be calculated to yield a friction effect below the turbulent region. This precise width will, of course depend on the rheological properties of the fluid being processed.

ILLUSTRATIVE EXAMPLES OF THE INVENTION

In this application and accompanying drawings a preferred embodiment of our invention has been shown and described, and various alternatives and modifications thereof have been suggested. It is to be understood, however, that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited to the condition of a particular case.

Figure 1:
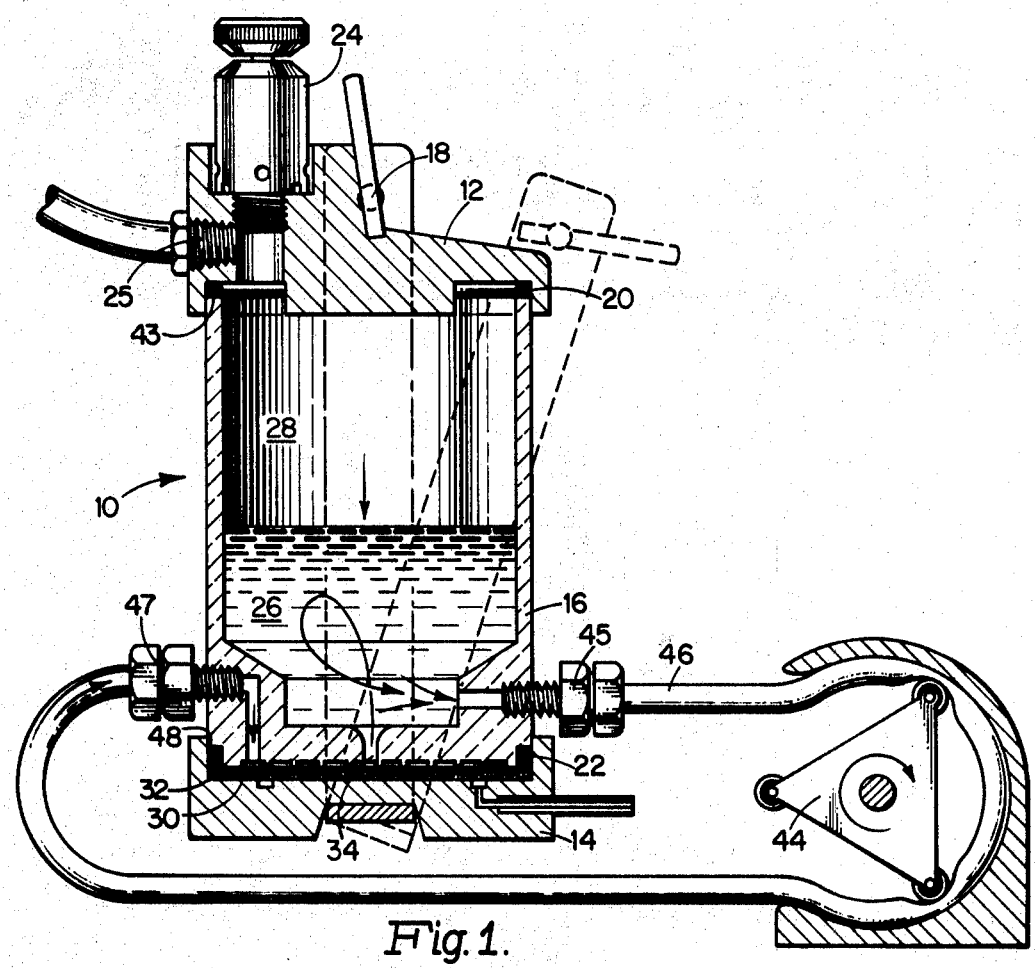
FIG. 1 is an elevational view, partly in section, of one embodiment of the apparatus of the invention together with a schematic diagram showing a typical recirculation-flow ultrafiltration operation.
Figure 2:
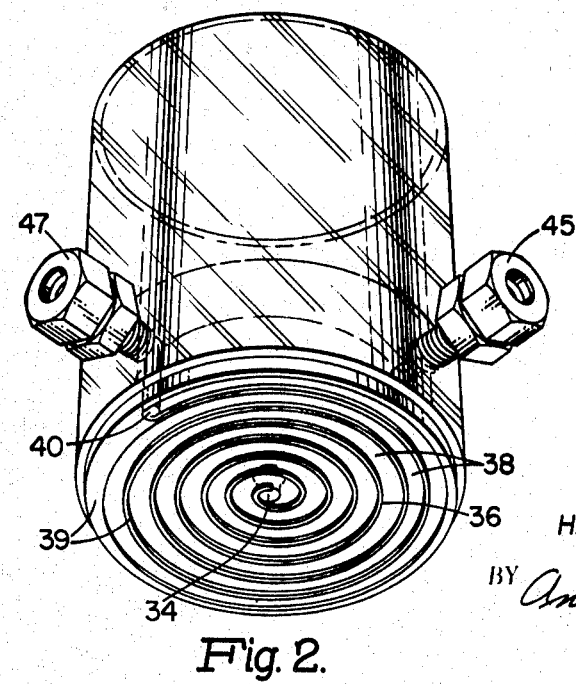
FIG. 2 is a perspective view showing the reservoir assembly of FIG. 1.

Referring to FIGS. 1 and 2, it is seen that an ultrafiltration cell 10 comprises a top cap 12, a bottom cap 14 and cylinder assembly 16. The cylinder is compressed and sealed between caps 14 and 16 by means of toggle clamping assembly 18, top O-ring seal 20, and bottom O-ring seal 22.

Top cap 12 comprises a pressure relief valve 24 and a port 25 for pressurizing a macromolecular solution 26 in reservoir 28.

Resting on bottom cap 14 is a macroporous support plate 30 formed of sintered polypropylene. Over plate 30 is an ultrafiltration membrane 32. Lower O-ring seal 22 is compressed against the outer periphery of membrane 32, thereby providing an efficient edge sealing means.

Cylinder assembly 16 comprises a reservoir 28 and an aperture 34 leading to reservoir 28 from a spiral flow path 36 which is formed by spiral grooves 38 on the bottom surface 39 of assembly 16. This flow path 36 is 0.125 inch wide and 0.010 inch high. It follows a spiral path in a plane parallel to the membrane surface, starting at a fluid inlet port 40 and terminating at path exit port 34. Upper circular bearing surface 43 and lower circular bearing surface 48 of cylinder assembly 16 bear against O-ring seals 20 and 22 respectively and by this action form a seal that is entirely suitable for operation at low and moderate pressures when toggle clamping assembly 18 is in vertical or clamping position.

FIG. 1 also shows a flow diagram useful in a typical ultrafiltration operation carried out with the instant apparatus and its relationship to the cylinder assembly 16 and flow path 36.

A peristaltic pump 44 is used to draw solution 26 from reservoir 28 through outlet port 45 and conduit 46 and to force it into inlet port 47, thence through port 40 and spiral flow path 36. The liquid emerges from flow path 36 and spins through aperture 34 into reservoir 28. Even at rather low operating pressures, e.g. as low as 2 p.s.i.g., the spinning stream emerging from aperture 34 performs an excellent mixing function. The peristaltic pump is a particularly advantageous pump means for use with biological fluids, e.g. blood, which are subject to degradation when subjected to the usual pump means.

Of course, the above described flow scheme is only one of many that can be used with the apparatus of the invention. For example, one may not require a recirculation feature. In such a case the feed may be supplied to flow path 36 downwardly through aperture 14 and out the usual inlet port 40. Those skilled in the art will readily discern other advantageous flow schemes involving either one or several units. For or example, it will be understood that several of the cylinder assemblies may be stacked or nested together to provide either parallel or serial flow patterns.

I claim:

1. Ultrafiltration apparatus comprising a reservoir assembly, a flow-directing means integral with said reservoir assembly, an ultrafiltration membrane which bears against said flow directing means forming a flow path therewith, said flow path forming a conduit between said reservoir and a port into said apparatus, and means to drive liquid from said reservoir through said flow path.

2. A reservoir assembly suitable for use in ultrafiltration apparatus and comprising a flow-directing means integral with said reservoir assembly, said flow-directing means being suitable for use, when brought to bear against an ultrafiltration membrane, to form with said membrane a conduit between said reservoir and a port into said assembly.

3. Apparatus as defined in claim 1 wherein the membrane is an anisotropic ultrafiltration membrane.

4. Apparatus as defined in claim 1 wherein the membrane is a reverse osmosis membrane.

5. Apparatus as defined in claim 1 wherein the membrane is an isotropic depth-type filter membrane.

6. Apparatus as defined in claim 1 wherein said means to drive liquid from said reservoir through said flow path is a peristaltic pump means mounted external to the reservoir.

7. Apparatus as defined in claim 1 wherein the flow path between said reservoir and said port is a spiral path.

8. Apparatus as defined in claim 7 wherein said spiral flow path extends between a point proximate the center of said reservoir and said port into said apparatus.